(No Model.)
S. W. VIETS.
ATTACHMENT TO EDGERS.
No. 289,184. Patented Nov. 27, 1883.
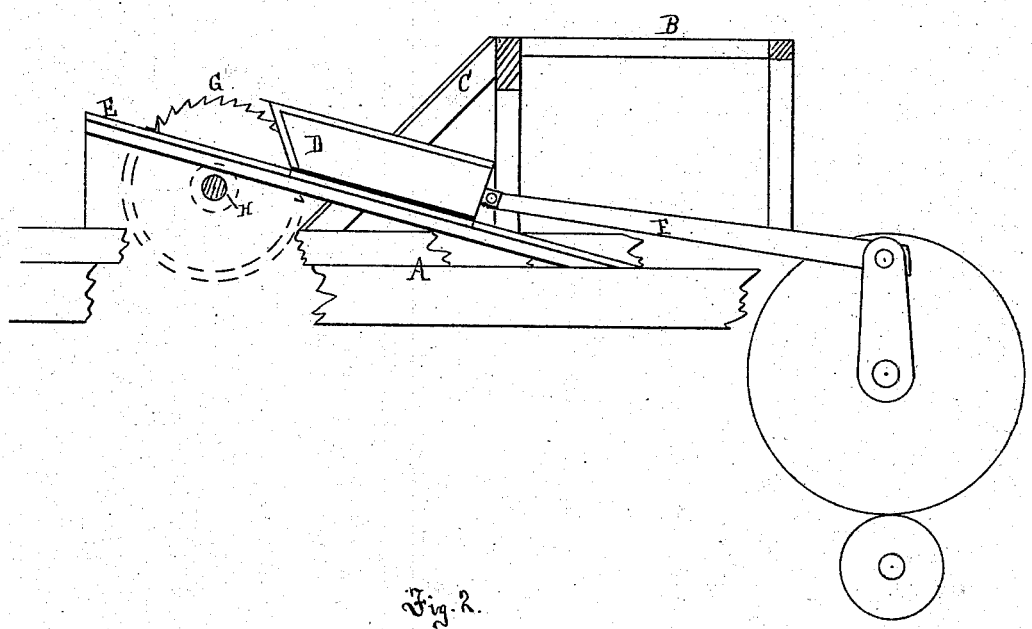
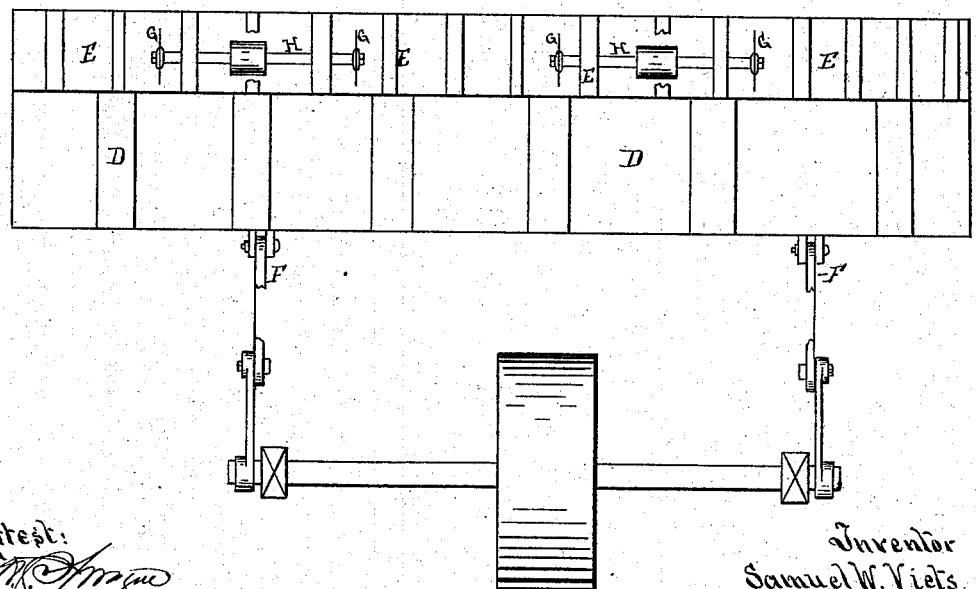

UNITED STATES PATENT OFFICE.

SAMUEL W. VIETS, OF OSCODA, MICHIGAN.

ATTACHMENT TO EDGERS.

SPECIFICATION forming part of Letters Patent No. 289,184, dated November 27, 1883.

Application filed June 27, 1883. (No model.)

*To all whom it may concern:*

Be it known that I, SAMUEL W. VIETS, of Oscoda, in the county of Iosco and State of Michigan, have invented new and useful Improvements in Attachments to Edgers; and I do hereby declare that the following is a full, clear, and exact description thereof, reference being had to the accompanying drawings, which form a part of this specification.

This invention relates to certain new and useful improvements in attachments to that class of machinery denominated "edgers;" and the invention consists in the peculiar construction and arrangement of a reciprocating table, which conveys the edgings as they fall from the edging-table to a series of stationary saws, for the purpose of sawing such edgings into suitable lengths, all as more fully hereinafter set forth.

Figure 1 is a sectional end elevation. Fig. 2 is a top plan.

In the drawings, A represents the floor of the mill, upon which is situated the edging-machine and table B of any of the known constructions.

C represents inclined sides, secured at one side of the edging-table B, and are for the purpose of conveying edgings from the table B to and upon the table D, which has a reciprocating movement upon the inclined ways, such reciprocation being imparted to the table D through the medium of a pitman operated by a suitable crank-connection, as F, to any convenient power or shaft in the mill.

G represents circular saws mounted upon the stationary arbors H, properly journaled in the frame-work which supports the inclined ways E.

The inclined slides C, it will be seen, perform the double function of conveying the edgings from the table B to the reciprocating table D and of forming a stop for forcing the edgings onto the ways E during the back travel of the table D.

In practice, the edgings are deposited upon the reciprocating table D from the edging-table B. In the retraction or back travel of the table D the edgings are forced off of such table by the inclined slides C falling upon the ways E. In the return of the table D these edgings are forced upon the saws G, which cut them into lengths equal to the distance between the saws, and from these ways E the edgings fall into any proper carrier, (not shown,) which conveys them outside the mill.

What I claim as my invention is—

1. In an attachment to edging-machines, the saws G, inclined ways E, supported on the saw-table, the table D, sliding on said ways, and mechanism, substantially as described, for reciprocating said table, as and for the purpose set forth.

2. An attachment to edging-machines, consisting of the table B, the slides C, inclined from the table toward the saw, inclined ways E, reciprocating table D, sliding on said inclined ways, and saws G, substantially as and for the purpose described.

3. In an attachment to edging-machines, the combination of the table B, the inclined slides C, ways E, the reciprocating table D, having its top adapted to receive the material from the slides, and its front part arranged to retreat behind said slides, whereby the latter push the material off the table onto the ways, substantially as described.

SAMUEL W. $\times$ VIETS.
his mark.

Witnesses:
CHARLOTTE E. WORKMAN,
J. K. GAILEY.